(12) United States Patent
Chin et al.

(10) Patent No.: US 8,958,784 B2
(45) Date of Patent: Feb. 17, 2015

(54) TELEPHONE CALL CO-PROCESSING IN FOR MOBILE TELEPHONES

(75) Inventors: Jordan Chin, Cary, NC (US); Eric R. Kern, Chapel Hill, NC (US); Luke D. Remis, Raleigh, NC (US); Sarah E. Smith, Apex, NC (US); Timothy M. Wiwel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 13/462,795

(22) Filed: May 2, 2012

(65) Prior Publication Data

US 2013/0295929 A1 Nov. 7, 2013

(51) Int. Cl.
*H04M 3/42* (2006.01)
*H04W 4/16* (2009.01)
*H04W 8/24* (2009.01)

(52) U.S. Cl.
CPC .............. *H04W 4/16* (2013.01); *H04W 8/245* (2013.01)
USPC .......................................... 455/417; 455/418

(58) Field of Classification Search
None
See application file for complete search history.

(56) References Cited

U.S. PATENT DOCUMENTS

| | | | |
|---|---|---|---|
| 7,447,513 B2* | 11/2008 | Anttila et al. | 455/519 |
| 8,515,407 B1* | 8/2013 | Mok et al. | 455/417 |
| 2003/0022671 A1* | 1/2003 | Huomo et al. | 455/436 |
| 2006/0142012 A1* | 6/2006 | Kirchhoff et al. | 455/445 |
| 2013/0115932 A1* | 5/2013 | Williams et al. | 455/417 |

* cited by examiner

*Primary Examiner* — Suhail Khan
(74) *Attorney, Agent, or Firm* — Steven M. Greenberg, Esq.; CRGO Law

(57) ABSTRACT

Embodiments of the present invention provide a method, system and computer program product for telephone call co-processing in a mobile telephony environment. In an embodiment of the invention, a method of telephone call co-processing in a mobile telephony environment is provided. The method includes monitoring a resource state of a selected mobile telephone, such as cellular network signal strength or battery charge. The method additionally includes detecting weakness of the resource state sufficient to inhibit the maintenance of a telephone call in the selected mobile telephone. Finally, the method includes, in response to detecting weakness of the resource state, identifying a different mobile telephone proximate to the selected mobile telephone and utilizing the different mobile telephone to process a telephone call.

16 Claims, 2 Drawing Sheets

TELEPHONE CALL CO-PROCESSING IN FOR MOBILE TELEPHONES

BACKGROUND OF THE INVENTION

1. Field of the Invention

The present invention relates to mobile phone telephony and more particularly to weak resource management for mobile telephones.

2. Description of the Related Art

Cellular telephony has changed the manner in which individuals communicate. Prior to the widespread availability of reliable mobile communications, individuals were linked to one another by voice only when through wireline communications. Yet, as individuals often were not geographically placed in proximity to a conventional telephone, individuals were largely unavailable to communicate with one another for most of every day. With the widespread availability of mobile communications, however, now individuals can be reached at literally almost any moment of any day to the extent that an entire generation does not know first hand the feeling of being inaccessible for even a few minutes and for many, the inability to place or receive a cellular telephone call can be anxiety provoking.

To support constant availability to communicate amongst the global populace, cellular telephone network providers have constructed and deployed massive digital cellular communications networks consisting of many hundreds of thousands of cell towers supporting correspondingly as many communicative cells. Notwithstanding, aside from the occasional unavailability of a cell tower, there are several reasons why an individual many not enjoy the ability to place or receive a cellular telephone call. Familiar to most, the weak or dead battery is the basis for the frustrating inability to place or receive a telephone call Likewise, the presence of an individual within a structure formed of materials which inhibit the passage of a cell signal also provides a bases for one being unable to place a cellular telephone call. In the latter instance, within a building oftentimes one cannot place or receive a telephone call.

Ironically, while it is important to the individual to enjoy the ability to place a telephone call at any time, for the majority of the time during which an individual can place or receive a telephone call within a cellular telephone network, the reality is that the individual mostly will not place or receive a telephone call within the cellular telephone network despite the ability to do so. Accordingly, the ability to place or receive a telephone call—as a resource unto itself—is largely wasted. This reality is even more frustrating for the individual unable to place or receive a telephone call for reasons of poor cellular telephone signal or weak or dead telephone battery.

BRIEF SUMMARY OF THE INVENTION

Embodiments of the present invention address deficiencies of the art in respect to telephone call processing in a cellular telephone and provide a novel and non-obvious method, system and computer program product for telephone call co-processing in a mobile telephony environment. In an embodiment of the invention, a method of telephone call co-processing in a mobile telephony environment is provided. The method includes monitoring a resource state of a selected mobile telephone, such as cellular network signal strength or battery charge. The method additionally includes detecting weakness of the resource state sufficient to inhibit the maintenance of a telephone call in the selected mobile telephone. Finally, the method includes, in response to detecting weakness of the resource state, identifying a different mobile telephone proximate to the selected mobile telephone and utilizing the different mobile telephone to process a telephone call.

In one aspect of the embodiment, utilizing the different mobile telephone to process the telephone call can include establishing a voice over Internet protocol (IP) telephone session between the selected mobile telephone and the different mobile telephone in a data communications network, initiating a telephone call between the different mobile telephone and a called party over a cellular communications network and routing voice communications between the selected mobile telephone and the called party over the voice over IP telephone session and the telephone call. In another aspect of the embodiment, the different mobile telephone is selected from amongst other mobile telephones proximate to the selected mobile telephone according to a comparably strong cellular network signal of the different mobile telephone, or comparably strong battery charge of the different mobile telephone. In yet another aspect of the embodiment, utilizing the different mobile telephone to process the telephone call can include detecting a physical collision between the selected mobile telephone and the different mobile telephone and registering the different mobile telephone to process the telephone call on behalf of the selected mobile telephone in response to the physical collision.

In another embodiment of the invention, a mobile telephone is provided. The mobile telephone includes a radio frequency (RF) section, an analog baseband section and a digital baseband section. The RF, analog and digital baseband sections collectively process telephone calls onto a cellular telephone network through an antenna. The mobile telephone additionally includes at least one processor and memory disposed in the digital baseband section hosting execution of a telephone call co-processing module. The module monitors a resource state of the mobile telephone, detects weakness of the resource state sufficient to inhibit the maintenance of a telephone call in the mobile telephone, and responsive to detecting weakness of the resource state, identifies a different mobile telephone and utilizing the different mobile telephone to process the telephone call. In one aspect of the embodiment, the mobile telephone also includes an accelerometer. The telephone call co-processing module can utilize the different mobile telephone to process the telephone call by detecting through the accelerometer a physical collision with the different mobile telephone and registering for the different mobile telephone to process the telephone call in response to the physical collision.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for telephone call co-processing in a mobile telephony environment. In accordance with an embodiment of the invention, a resource state of a selected cellular telephone that is integral to either placing or receiving a telephone call in the selected cellular telephone can be determined. If the resource state is such that a telephone call is not likely to be able to be placed, received, maintained, or any combination thereof due to the resource state of the selected cellular telephone, a proximate cellular telephone can be identified and telephone call processing for the selected cellular telephone can be offloaded to the proximate cellular telephone so long as the resource state of the proximate cellular telephone is such that a telephone call is likely to be able to be placed, received, maintained, or any combination thereof.

Figure 1:
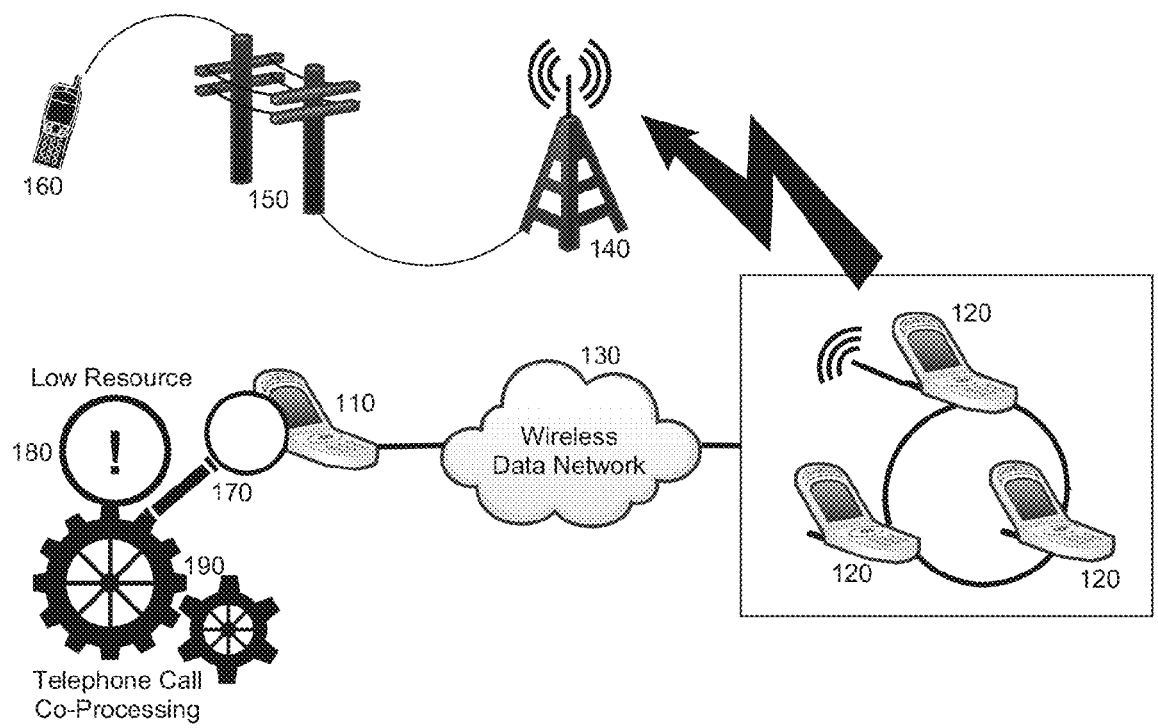
FIG. 1 is a pictorial illustration of a process for telephone call co-processing in a mobile telephony environment.

In further illustration, FIG. 1 pictorially shows a process for telephone call co-processing in a mobile telephony environment. As shown in FIG. 1, the resources 170 of a selected mobile telephone 110, such as battery charge or cellular signal strength, can be monitored by telephone call co-processing logic 190. Responsive to detecting a low resource condition 180 sufficient to call into question whether or not the selected mobile telephone 110 can initiate, receive or maintain a telephone call, the telephone call co-processing logic 190 can identify a different mobile telephone 120 with sufficient resources amongst a selection of mobile telephones 120 over a wireless data communications network 130 such as a personal area network (PAN) supported by short range RF communications like "Bluetooth" and established amongst the mobile telephones 110, 120 or a local area network (LAN) supported by wireless data communications like "Wi-Fi" or "802.11x" type technologies and established amongst the mobile telephones 110, 120.

Once a different mobile telephone 120 amongst the different mobile telephones 120 has been identified, the telephone call co-processing logic 190 can direct the identified one of the different mobile telephones 120 to process a telephone call from a remote telephone 160 over the public switched telephone network (PSTN) 150 by way of a cellular communications network 140. For example, the telephone call co-processing logic 190 can direct the identified one of the mobile telephones 120 to receive a telephone call forwarded from the selected mobile telephone 110. As another example, the telephone call co-processing logic 190 can direct the identified one of the mobile telephones 120 to initiate a telephone call to the remote telephone 160 and to bridge to and from the remote telephone 160 voice over IP (VoIP) data exchanged over the wireless data communications network 120 between the selected mobile telephone 210 and the identified one of the different mobile telephones 120.

Figure 2:
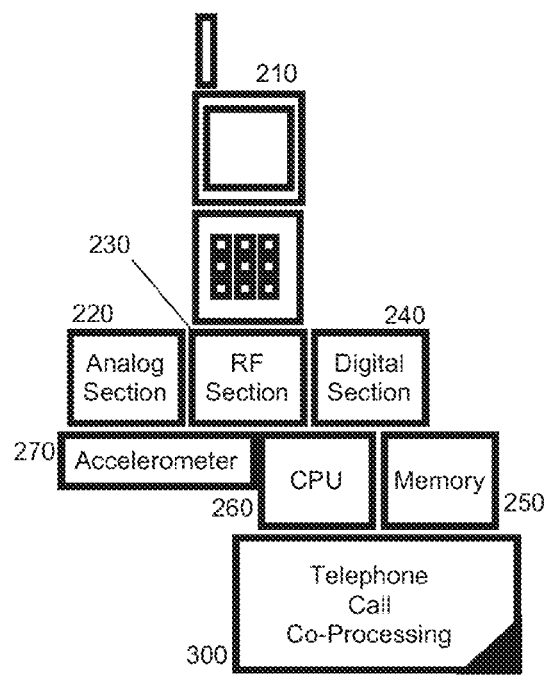
FIG. 2 is a schematic illustration of a telephone call data processing system configured for telephone call co-processing in a mobile telephony environment.

The process illustrated in connection with FIG. 1 can be implemented within a telephone call data processing system. In yet further illustration, FIG. 2 schematically illustrates a telephone call data processing system configured for telephone call co-processing in a mobile telephony environment.

The system can include a mobile telephone 210 that includes each of an analog baseband section, an RF section 230 and a digital baseband section 240. The digital baseband section 240 can include at least one processor 260 and memory 250. Finally, telephone call co-processing module 300 can execute in the memory 250 of the digital baseband section 240.

Telephone call co-processing module 300 can include program code that when executed by the processor or processors 260 of the digital baseband section 240 can monitor one or more resources of the mobile telephone 210 such as battery charge or cellular network signal. In response to determining that a state of the monitored resource is such that a telephone call is not likely to be able to be placed, received, maintained, or any combination thereof by the mobile telephone 210, a proximate cellular telephone can be identified and telephone call processing for the selected cellular telephone can be offloaded to the proximate cellular telephone so long as the resource state of the proximate cellular telephone is such that a telephone call is likely to be able to be placed, received, maintained, or any combination thereof.

Optionally, an accelerometer 270 can be coupled to the digital base band section 240. The program code of the telephone call co-processing module 300 can respond to the accelerometer 270 detecting a collision with the mobile telephone 210—for instance, a "bump" by another cellular telephone, by registering the mobile telephone 210 to co-process a telephone call on behalf of another cellular telephone previously registered to request co-processing of telephone calls by other mobile telephones. Further, the program code of the module 300 can register with a remote service to forward telephone calls intended for the mobile telephone 210 to another mobile telephone registering to co-process telephone calls responsive to the receipt of a "bump" by the mobile telephone 210.

Figure 3:
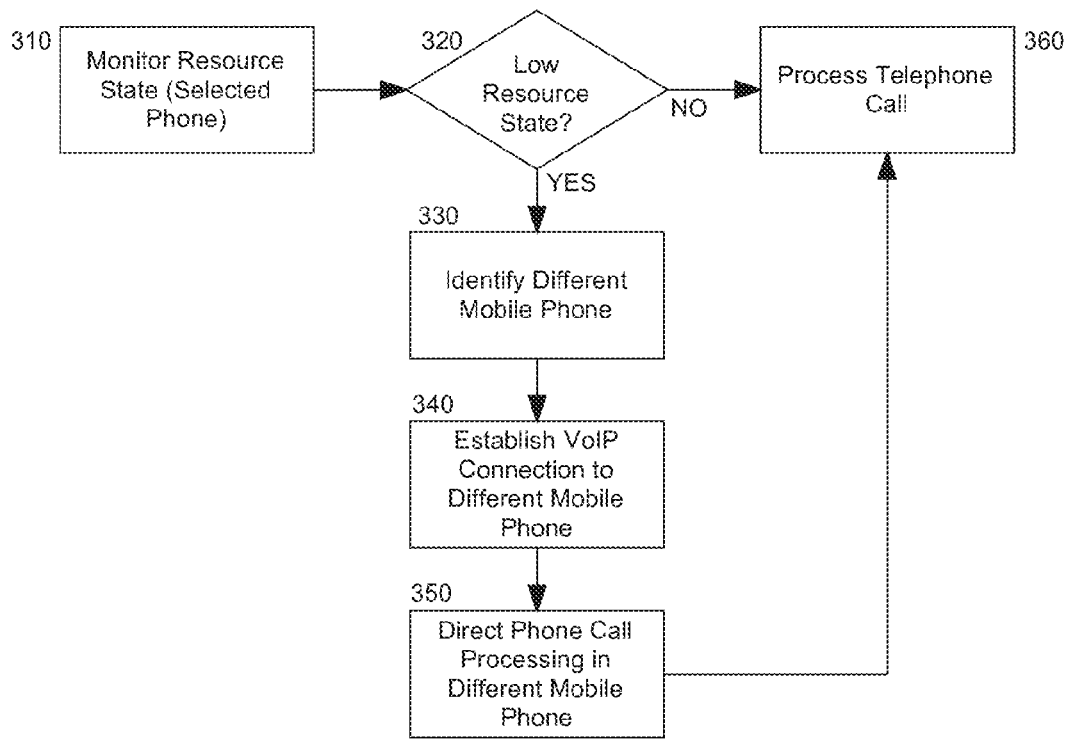
FIG. 3 is a flow chart illustrating a process for telephone call co-processing in a mobile telephony environment; and, FIG. 4 is a flow chart illustrating a process for telephone call co-processing triggered by bump.

In yet further illustration of the operation of the module 300, FIG. 3 is a flow chart illustrating a process for telephone call co-processing in a mobile telephony environment. Beginning in block 310, the state of a resource of a selected mobile telephone such as battery charge or network signal strength can be monitored for weakness. In decision block 320, if it is determined that the monitored resource state is low beyond a threshold indicating the probability that the selected mobile telephone will be unable to receive, initiate or maintain a telephone call, in block 330 a different mobile telephone can be identified with sufficient resources to receive, initiate and maintain a telephone call. Subsequently, in block 340 a VoIP communicative session can be established between the mobile telephone and the selected mobile telephone and the different mobile telephone.

Finally, in block 350 the different mobile telephone can be directed to process a telephone call on behalf of the selected mobile telephone and in block 360 the telephone call can be processed by the different mobile telephone call on behalf of the selected mobile telephone. In this regard, voice traffic received by the different mobile telephone from the telephone call can be passed to the selected mobile telephone as VoIP data, and voice traffic provided by the selected mobile telephone to the different mobile telephone as VoIP data can be passed onto the telephone call by the different mobile telephone.

Figure 4:
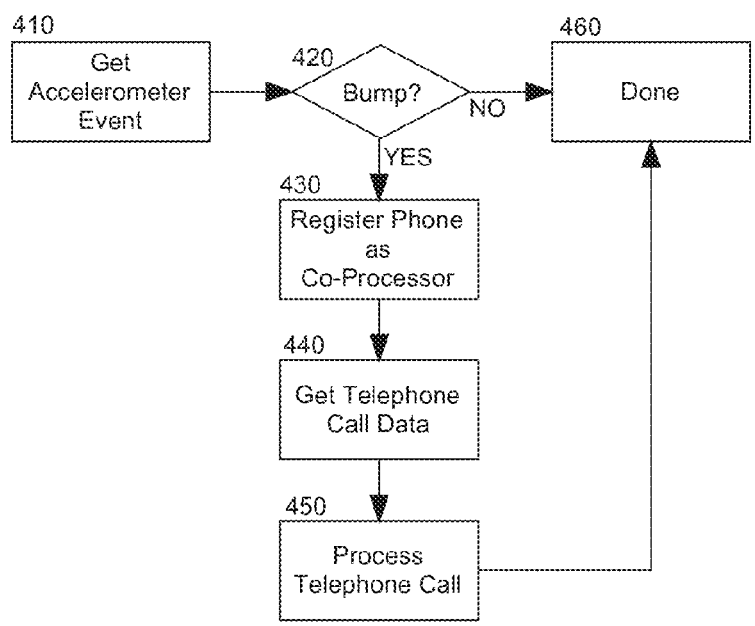

Optionally, the co-processing of a telephone call by the different mobile telephone can be initiated responsive to the receipt of a "bump" measured by an accelerometer. In further illustration, FIG. 4 is a flow chart illustrating a process for telephone call co-processing triggered by bump. Beginning in block 410, an accelerometer event can be received and in decision block 420, it can be determined if the event indicated the receipt of a "bump"—for instance, by analyzing the nature of the accelerometer data giving rise to the event. If in decision block 420 it is determined that a bump has been received, in block 430 the mobile telephone can transmit a message onto a data communications network to a remote service that the phone is to be registered to co-process telephone calls. In block 440, telephone call data can be received for a telephone call to be co-processed by the mobile telephone on behalf of the mobile telephone having caused the "bump". Thereafter, in block 450 the telephone call can be processed and the process can end in block 460 the process can end.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of telephone call co-processing in a mobile telephony environment, the method comprising:
    monitoring a resource state of a selected mobile telephone;
    detecting weakness of the resource state sufficient to inhibit maintenance of a telephone call in the selected mobile telephone with a called party over a cellular communications network; and,
    responsive to detecting weakness of the resource state, identifying a different mobile telephone proximate to the selected mobile telephone and utilizing the different mobile telephone to process a telephone call by establishing a voice over Internet protocol (VoIP) session between the selected mobile telephone and the different mobile telephone in a data communications network, by initiating a telephone call between the different mobile telephone and the called party over the cellular communications network, and bridging the telephone call from the selected mobile telephone through the different mobile telephone to the called party by passing over the VoIP session to the selected mobile telephone, voice data received between the different telephone and the called party.

2. The method of claim 1, wherein the resource state is cellular network signal strength.

3. The method of claim 1, wherein the resource state is battery charge.

4. The method of claim 1, further comprising selecting the different mobile telephone from amongst a plurality of different mobile telephones proximate to the selected mobile telephone according to a comparably strong cellular network signal of the different mobile telephone.

5. The method of claim 1, further comprising selecting the different mobile telephone from amongst a plurality of different mobile telephones proximate to the selected mobile telephone according to a comparably strong battery charge of the different mobile telephone.

6. The method of claim 1, wherein utilizing the different mobile telephone to process the telephone call comprises:
    detecting a physical collision between the selected mobile telephone and the different mobile telephone; and,
    bridging the telephone call in response to the physical collision.

7. A computer program product for telephone call co-processing in a mobile telephony environment, the computer program product comprising:
    a computer readable storage medium comprising a memory device having computer readable program code embodied therewith, the computer readable program code comprising:
    computer readable program code for monitoring a resource state of a selected mobile telephone;
    computer readable program code for detecting weakness of the resource state sufficient to inhibit maintenance of a telephone call in the selected mobile telephone with a called party over a cellular communications network; and,
    computer readable program code for responsive to detecting weakness of the resource state, identifying a different mobile telephone proximate to the selected mobile telephone and utilizing the different mobile telephone to process a telephone call by establishing a voice over Internet protocol (VoIP) session between the selected mobile telephone and the different mobile telephone in a data communications network, by initiating a telephone call between the different mobile telephone and the called party over the cellular communications network, and bridging the telephone call from the selected mobile telephone through the different mobile telephone to the called party by passing over the VoIP session to the selected mobile telephone, voice data received between the different telephone and the called party.

8. The computer program product of claim 7, wherein the resource state is cellular network signal strength.

9. The computer program product of claim 7, wherein the resource state is battery charge.

10. The computer program product of claim 7, further comprising computer readable program code for selecting the different mobile telephone from amongst a plurality of different mobile telephones proximate to the selected mobile telephone according to a comparably strong cellular network signal of the different mobile telephone.

11. The computer program product of claim 7, further comprising computer readable program code for selecting the different mobile telephone from amongst a plurality of different mobile telephones proximate to the selected mobile telephone according to a comparably strong battery charge of the different mobile telephone.

12. The computer program product of claim 7, wherein the computer readable program code for utilizing the different mobile telephone to process the telephone call comprises:
    computer readable program code for detecting a physical collision between the selected mobile telephone and the different mobile telephone; and,
    computer readable program code for bridging the telephone call in response to the physical collision.

13. A mobile telephone comprising:
    a radio frequency (RF) section, an analog baseband section and a digital baseband section, the RF, analog and digital baseband section processing telephone calls onto a cellular telephone network through an antenna;
    at least one processor and memory disposed in the digital baseband section hosting execution of a telephone call co-processing module, the module monitoring a resource state of the mobile telephone, detecting weakness of the resource state sufficient to inhibit maintenance of a telephone call in the mobile telephone with a called party over the cellular communications network, and responsive to detecting weakness of the resource state, identifying a different mobile telephone and utilizing the different mobile telephone to process the telephone call by establishing a voice over Internet protocol (VoIP) session between the selected mobile telephone and the different mobile telephone in a data communications network, by initiating a telephone call between the different mobile telephone and the called party over the cellular communications network, and bridging the telephone call from the selected mobile telephone through the different mobile telephone to the called party by passing over the VoIP session to the selected mobile telephone, voice data received between the different telephone and the called party.

14. The mobile telephone of claim 13, wherein the resource state is cellular network signal strength.

15. The mobile telephone of claim 13, wherein the resource state is battery charge.

16. The mobile telephone of claim 13, further comprising an accelerometer, the telephone call co-processing module utilizing the different mobile telephone to process the telephone call by detecting through the accelerometer a physical collision with the different mobile telephone and bridging the telephone call in response to the physical collision.

* * * * *